United States Patent
Efrat et al.

(10) Patent No.: US 10,702,789 B2
(45) Date of Patent: Jul. 7, 2020

(54) THERMAL DESALINATION SYSTEM WITH MULTI-EFFECT EVAPORATOR AND FLUIDIZED BED CRYSTALLIZER

(71) Applicant: I.D.E. TECHNOLOGIES LTD, Kadima (IL)

(72) Inventors: Tomer Efrat, Kadima (IL); Alex Drak, Kadima (IL)

(73) Assignee: I.D.E. TECHNOLOGIES LTD, Kadima (IL)

( * ) Notice: Subject to any disclaimer, the term of this patent is extended or adjusted under 35 U.S.C. 154(b) by 0 days.

(21) Appl. No.: 16/099,375

(22) PCT Filed: Jul. 4, 2017

(86) PCT No.: PCT/IB2017/054028
§ 371 (c)(1),
(2) Date: Nov. 6, 2018

(87) PCT Pub. No.: WO2018/007942
PCT Pub. Date: Jan. 11, 2018

(65) Prior Publication Data
US 2019/0209943 A1 Jul. 11, 2019

(30) Foreign Application Priority Data
Jul. 6, 2016 (GB) .................................. 1611761.6

(51) Int. Cl.
*B01D 1/26* (2006.01)
*B01D 9/00* (2006.01)
(Continued)

(52) U.S. Cl.
CPC ............... *B01D 1/26* (2013.01); *B01D 3/065* (2013.01); *B01D 9/0036* (2013.01); *C02F 1/042* (2013.01);
(Continued)

(58) Field of Classification Search
None
See application file for complete search history.

(56) References Cited

U.S. PATENT DOCUMENTS

| 3,399,975 | A | 9/1968 | Otten |
| 3,476,655 | A | 11/1969 | Sieder |
| 2008/0025908 | A1 | 1/2008 | Chu et al. |

FOREIGN PATENT DOCUMENTS

| CN | 101306260 A | 11/2008 |
| CN | 204644034 U | 9/2015 |
| CN | 105036222 A | 11/2015 |

OTHER PUBLICATIONS

Stanford, et al. Inland Desalination: Current Practices, Environmental Implications, and Case Studies in Las Vegas, NV, Sustainability Science and Engineering, vol. 2, 2010, Elseveir. (Year: 2010).*
(Continued)

*Primary Examiner* — Derek N Mueller
(74) *Attorney, Agent, or Firm* — Fresh IP PLC; Aubrey Y Chen

(57) ABSTRACT

A thermal desalination system, comprising a multi-effect evaporator comprising a plurality of effects, configured to produce product water and brine and a fluidized bed crystallizer, configured to remove dissolved minerals and/or solids from the water, wherein the fluidized bed crystallizer is disposed between at least two effects of the multi-effect evaporator.

14 Claims, 1 Drawing Sheet

(51) Int. Cl.
*C02F 1/04* (2006.01)
*C02F 1/68* (2006.01)
*B01D 3/06* (2006.01)
*C02F 1/06* (2006.01)
*C02F 1/52* (2006.01)
*C02F 103/08* (2006.01)
*C02F 101/10* (2006.01)

(52) U.S. Cl.
CPC .................. *C02F 1/06* (2013.01); *C02F 1/68* (2013.01); *C02F 2001/5218* (2013.01); *C02F 2101/10* (2013.01); *C02F 2103/08* (2013.01); *C02F 2303/22* (2013.01); *Y02A 20/128* (2018.01); *Y02A 20/132* (2018.01)

(56) References Cited

OTHER PUBLICATIONS

International Search Report dated Oct. 16, 2017 for PCT/IB2017/054028.

\* cited by examiner

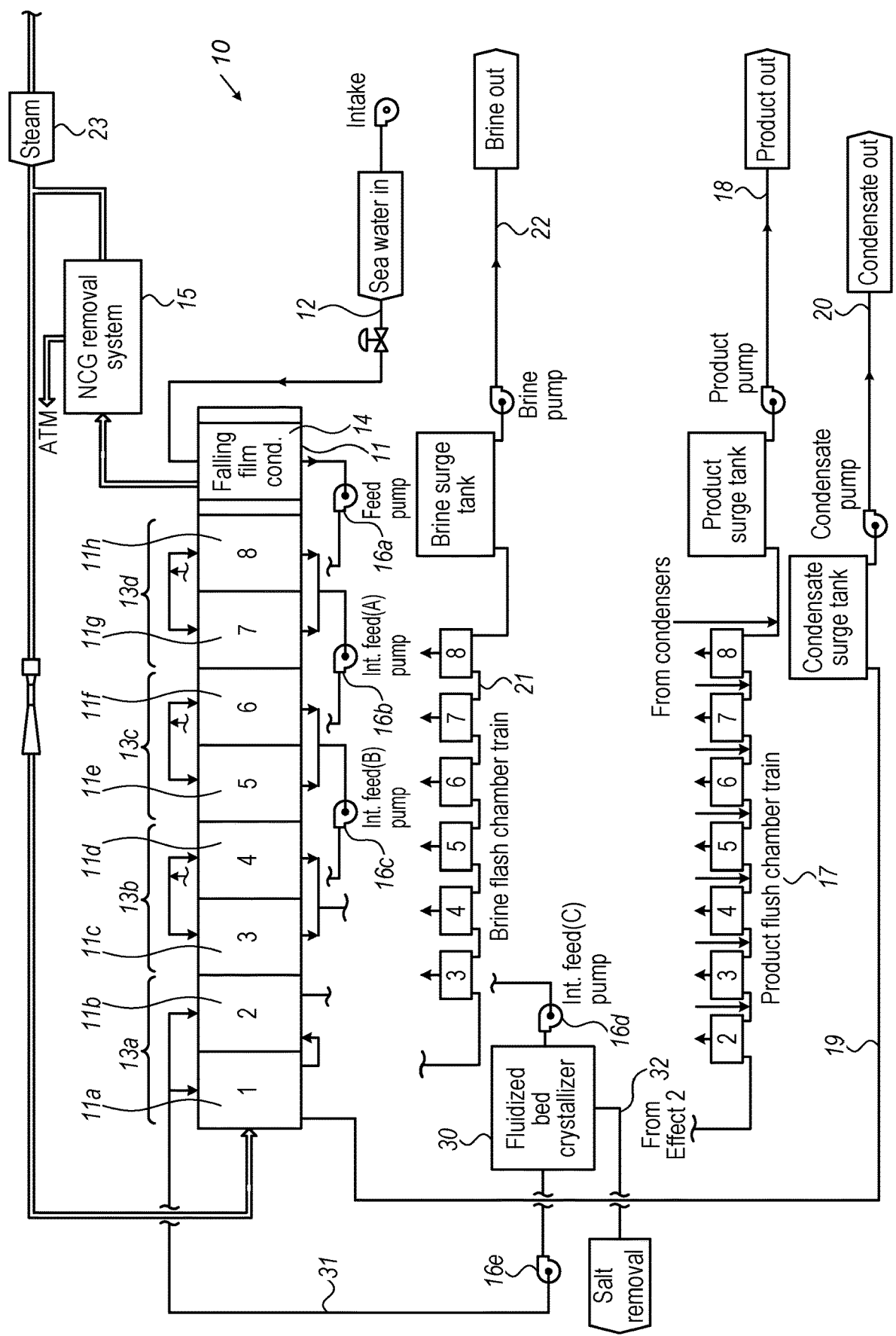

THERMAL DESALINATION SYSTEM WITH MULTI-EFFECT EVAPORATOR AND FLUIDIZED BED CRYSTALLIZER

This application claims the benefit of Great Britain Patent Application No. 1611761.6, filed Jul. 6, 2016, which is hereby incorporated by reference in its entirety.

This invention relates to a thermal desalination system and a method of operating a thermal desalination system.

BACKGROUND TO THE INVENTION

In a thermal desalination system, comprising a multi-effect evaporator having a plurality of effects, feed water is supplied to a first effect where it is heated, for example by steam passing through heating tubes. Water vapour is evaporated from the feed water and is passed through heating tubes in a subsequent effect, and a series of effects can be chained in this way. The water vapour is condensed and removed as product water. Depending on the configuration of the system, steam may be introduced into the first or last effect.

A limiting factor in the operating temperature of the system, and hence in the efficiency of recovery of the system and its cost-effectiveness, arises from the presence in the feed water of dissolved minerals. In sea water, a particular problem is the presence of calcium and carbonates which form calcium carbonates ($CaCO_3$). At higher temperatures, the calcium carbonate is more likely to be precipitated, and thus the operating temperature of the final effect is limited by the proportion of dissolved minerals. Conventionally this problem is approached by either operating the systems at low recovery rates and/or relatively low temperature or by implementing a pre-treatment stage of the feed water with chemicals to reduce the dissolved mineral content, which is undesirable.

SUMMARY OF THE INVENTION

According to a first aspect of the invention there is provided a thermal desalination system, comprising a multi-effect evaporator comprising a plurality of effects, configured to produce product water and brine and a fluidized bed crystallizer, configured to remove dissolved minerals and/or solids from the water, wherein the fluidized bed crystallizer is located between at least two effects of the multi-effect evaporator.

The fluidized bed crystallizer may receive feed water from a first effect and supply feed water to a second effect.

The first effect may be a colder effect and the second effect may be a hotter effect.

The second effect may be the hottest effect.

The fluidized bed crystallizer may be connected between a first group comprising a plurality of first effects and a second group comprising a plurality of second effects.

The system may further comprise a post-treatment unit, wherein at least some portion of the minerals removed by the fluidized bed crystallizer is introduced to the post-treatment unit to re-mineralize the product water.

The dissolved minerals and/or solids may be calcium and/or magnesium compounds.

The fluidized bed crystallizer may be configured to precipitate said minerals on a seed material.

The seed material may comprise sand particles.

The system may comprise a plurality of fluidized bed crystallizers disposed between respective effects of the multi-effect evaporator.

According to a second aspect of the invention there is provided a method of operating a thermal desalination system for treating water comprising introducing water exiting the pre-treatment unit into a multi-effect evaporator comprising a plurality of evaporator effects, directing the water from a first effect of the plurality of evaporator effects into a fluidized bed crystallizer, which is configured to remove dissolved minerals and/or solids from the water, and directing the water from the fluidized bed crystallizer to a second effect.

The first effect may be a colder effect and the second effect may be a hotter effect.

The method may comprise directing feed water from a first group comprising a plurality of first effects to the fluidized bed crystallizer and directing feed water from the fluidized bed crystallizer to a second group comprising a plurality of second effects.

The method may comprise introducing at least some of said minerals removed in the fluidized bed crystallizer into a post-treatment unit to re-mineralize the water.

BRIEF DESCRIPTION OF THE DRAWINGS

Embodiments of the invention are described by way of example only with reference to the accompanying drawing, wherein;

FIG. 1 is an illustration of a water treatment system comprising a multi-effect evaporator water treatment apparatus and a fluidized bed crystallizer,

DETAILED DESCRIPTION OF THE PREFERRED EMBODIMENTS

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Referring now to FIG. 1, a water treatment plant comprising a multi-effect evaporator 11 is generally shown at 10. A feed water supply is shown at 12, in this case to supply sea water where the water treatment plant is a thermal desalination plant. The multi-effect evaporator comprises a plurality of effects 11a-11h. Multiple effects may be connected so that they form groups of effects connected in parallel. In this example, the effects are connected in pairs, such that group 13a comprises effects 11a and 11b, group 13b comprises effects 11c and 11d, group 13c comprises effects 11e and 11f, and group 13d comprises effects 11g and 11h. A falling film element 14 receives the feed water from supply 12, and non-condensable gases are removed by NCG removal apparatus 15. First pump 16b transfers feed water from the falling film element 14 to 13d, second pump 16b transfers feed water from group 13d to group 13c, and third pump 16c transfers feed water from group 13c to group 13b. Product from each group of effects is received by a product flash chamber train 17 and is directed to a product outlet 18, and condensate from effect 11a is removed on line 19 and directed to condensate outlet 20. Brine from the final group 13a is removed via brine flash chamber train 21 and directed to a brine outlet 22. Heating steam is supplied from steam source 23, and is supplied to group 13a to provide the initial heating of feed water.

Successive groups of effects are hotter, that is they have a higher operating temperature than the preceding group upstream. Group 13a is the hottest group and group 13d is the coldest group in the system of FIG. 1.

It will be apparent that, as the feed water is transferred between successive groups of effects, it will become more concentrated, and the total dissolved solids in the feed water will increase.

To remove dissolved minerals and allow the operating temperature of the final group 13a to be increased, a fluidized bed crystallizer 30 is provided between cooler group 13b and hotter group 13a. In a fluidized bed crystallizer, water to be treated is forced upwardly through a bed of seed particles such as sand, so that the seed particles are in suspension. Dissolved minerals precipitate onto the seed particles and fall to a lower part of the apparatus, thus reducing the dissolved solid in the feed water and allow the precipitated minerals to be easily removed.

Fourth pump 16d passes feed water from group 13b to fluidized bed crystallizer 30. Feed water from the fluidized bed crystallizer 30 is then passed on line 31 to first group 13a, in this example via fifth pump 16e, although this may be omitted if desired. Although in this example all of the feed water is shown as passing through fluidized bed crystallizer 30, a bypass line may be provided so only a controllable part of the feed water is passed through the fluidized bed crystallizer 30.

A salt removal line 32 is connected to the fluidized bed crystallizer 30, to receive the removed minerals.

Accordingly, by passing the feed water through the fluidized bed crystallizer in this way, the total dissolved solids in the feed water can be reduced and the operating temperature in the final group 13a increased, in this example to 90° C. or higher. Advantageously, as the fluidized bed crystallizer is located in the middle of the MED process, the feed water entering the fluidized bed crystallizer will be potentially have a very high level of dissolved minerals, and indeed may be supersaturated with CaCO3, as the mineral content is concentrated during the water treatment process. Conventionally, dosage with reagents and adjustment of the feed water pH is required before or during treatment of water with a fluidized-bed crystallizer, to encourage precipitation and crystallization of the dissolved minerals. However, because of the very high concentration or supersaturation of the feed water in this example, only a minimal amount of chemical treatment needs to be used in the crystallization stage of the CaCO3, or indeed may be omitted completely.

Although a single fluidized bed crystallizer 30 is shown, connected between the hottest group 13a and a colder group 13b, it will be apparent that the fluidized bed crystallizer may be connected between any other pair of groups, or even between more than two groups, or instead between individual effects. A plurality of fluidized bed crystallizers may be provided, located between any groups or effects as appropriate, given the concentration of dissolved minerals in the feed water, and may additionally supply feed water from a hotter effect or group of effects to a cooler effect or group of effects.

Product water generated from a water purification or distillation apparatus such as from the water treatment system described herein must treated after purification to adjust the pH to approximately 8. Conventionally this is done performed for example by using carbonation or where appropriate by blending with source water. In this example, the appropriate post-treatment is provided by reintroducing minerals from the fluidized bed crystallizer 30. A post-treatment apparatus (not shown) may receive removed minerals on line 31 from the fluidized bed crystallizer 30 and product water on line 18, and the product water is treated with the recovered minerals to decrease the pH of the treated water to its desired level. The post-treatment apparatus may be any suitable conventional apparatus as desired, depending on the form in which the removed minerals are received from the fluidized bed crystallizer 30. It will be apparent that this modification advantageously provides a simple and on-site method of treating the product water from water treatment system 10.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belongs, unless otherwise defined.

The invention claimed is:

1. A thermal desalination system, comprising
a multi-effect evaporator comprising a plurality of effects, configured to produce product water and brine; and
a fluidized bed crystallizer disposed between at least two effects of the plurality of effects and configured to remove dissolved minerals and/or solids from the water,
wherein the fluidized bed crystallizer is connected to an outlet of a first effect of the at least two effects so as to receive feed water therefrom, the fluidized bed crystallizer also being connected to a second effect of the at least two effects so as to supply feed water to the second effect.

2. The system of claim 1, wherein the first effect is a colder effect and the second effect is a hotter effect.

3. The system of claim 2 wherein the second effect is the hottest effect of the at least two effects.

4. The system of claim 1 wherein the fluidized bed crystallizer connected between a first group comprising a plurality of first effects and a second group comprising a plurality of second effects.

5. The system of claim 1, further comprising a post-treatment unit, wherein at least some portion of the minerals removed by the fluidized bed crystallizer are introduced to the post-treatment unit to re-mineralize the product water.

6. The system of claim 1, wherein the dissolved minerals and/or solids are calcium and/or magnesium compounds.

7. The system of claim 1, wherein the fluidized bed crystallizer is configured to precipitate said minerals on a seed material.

8. The system of claim 7, wherein the seed material comprises sand particles.

9. The system of claim 1, wherein the system comprises a plurality of fluidized bed crystallizers disposed between respective effects of the multi-effect evaporator.

10. A method of operating a thermal desalination system for treating water comprising:
    introducing feed water from a sea water supply into a multi-effect evaporator comprising a plurality of evaporator effects;
    directing a first effluent water from a first effect of the plurality of evaporator effects into a fluidized bed crystallizer, which is configured to remove dissolved minerals and/or solids from the first effluent water;
    directing a second effluent water from the fluidized bed crystallizer to a second effect of the multi-effect crystallizer; and
    collecting product water.

11. The method of claim 10, wherein the first effect is a colder effect and the second effect is a hotter effect.

12. The method of claim 11 comprising directing the first effluent water from a first group comprising a plurality of first effects to the fluidized bed crystallizer and directing the second effluent water from the fluidized bed crystallizer to a second group comprising a plurality of second effects.

13. The method of claim 10, further comprising introducing at least some of said minerals adsorbed in the fluidized bed crystallizer into a post-treatment unit configured to re-mineralize the product water to adjust its pH to approximately 8.

14. The method of claim 13 wherein the post-treatment comprises removing recovered minerals from the fluidized bed crystallizer and reintroducing these minerals into the product water.

* * * * *